United States Patent [19]
Hill

[11] Patent Number: 5,848,707
[45] Date of Patent: Dec. 15, 1998

[54] STORAGE RACK WITH POSITION SENSING

[76] Inventor: Brian I. Hill, 335 Foxhill Dr., Buffalo Grove, Ill. 60089

[21] Appl. No.: 602,313

[22] Filed: Feb. 16, 1996

[51] Int. Cl.$^6$ ..................................................... A47F 7/00
[52] U.S. Cl. ..................... 211/13.1; 211/151; 250/222.1; 250/208.2; 340/557
[58] Field of Search ................................. 211/59.2, 13.1, 211/151

[56]     References Cited

U.S. PATENT DOCUMENTS

| | | | |
|---|---|---|---|
| 3,923,159 | 12/1975 | Taylor et al. | 211/59.2 |
| 4,384,280 | 5/1983 | Haag | 340/556 |
| 4,514,625 | 4/1985 | Heiland | 250/221 |
| 4,903,009 | 2/1990 | D'Ambrosia et al. | 340/556 |
| 5,198,661 | 3/1993 | Anderson et al. | 250/221 |
| 5,198,799 | 3/1993 | Pascale | 340/552 |
| 5,281,809 | 1/1994 | Anderson et al. | 250/221 |
| 5,302,942 | 4/1994 | Blau | 340/556 |
| 5,499,016 | 3/1996 | Pantus | 340/555 |
| 5,500,525 | 3/1996 | Saban | 250/221 |
| 5,552,767 | 9/1996 | Toman | 340/540 |

OTHER PUBLICATIONS

Department of Food Safety and Hygiene "AIB Consolidated Standards for Food Safety", pp. 6,7,14,15 No Date.
Konstant Products brochure, "The Konstant Challenge", 12 pages, 1992.
Brochure of Scientific Technologies Incorporated entitled "STI Offers You Application Solutions!," pp. 1–15 and three–page cover, mailed to the inventor and bearing a postmark dated Jan. 2, 1996.

*Primary Examiner*—Donald P. Walsh
*Assistant Examiner*—Emmanuel M. Marcelo
*Attorney, Agent, or Firm*—Marshall O'Toole, Gerstein, Murray & Borun

[57]              ABSTRACT

A storage structure is composed of a storage rack having a plurality of storage bays, each of which is adapted to store a bundle, such as a food-related bundle having a pallet and a number of boxes of food items positioned on the pallet. The storage bays are disposed in a plurality of rows between a first end of the storage rack and a second end of the storage rack, the rows including an upper row and a lower row. The storage structure has a transmitter for transmitting a beam of radiation and a receiver for receiving the beam of radiation. The transmitter is associated with the first end of the storage rack and is positioned to transmit the radiation beam in a direction substantially parallel to the side of the storage rack, and the receiver is associated with the second end of the storage rack. The storage structure has an alarm generator coupled to the receiver for generating an alarm when the radiation beam is interrupted by one of the bundles located on the storage rack.

20 Claims, 1 Drawing Sheet

STORAGE RACK WITH POSITION SENSING

BACKGROUND OF THE INVENTION

The present invention relates to a storage rack having a number of storage bays disposed in rows for storing bundles of goods.

Conventional storage racks used to store food-related items, such as boxes of ingredients used in the manufacture of food products, typically have a steel skeletal structure which defines a number of rows of storage bays disposed on top of each other. For storage racks used to store food-related items, the American Institute of Baking (AIB) promulgates certain requirements to prevent pests such as rodents and insects from contaminating the food items. One of these requirements is that the food items be stored on the rack no closer than eighteen inches from any adjacent wall and/or ceiling. The Food and Drug Administration has similar requirements.

To comply with these requirements, prior art storage facilities have been provided with heavy-duty steel angle irons which are embedded in the concrete floor adjacent the rear side of a storage rack, which faces a wall. The angle irons are composed of a pair of steel arms, such as four inches in width, which are joined together at a right angle. The angle irons are permanently embedded eighteen inches from the wall for the length of the rear side of the storage rack, which can be up to several hundred feet in length, with one of the angle-iron arms extending upwardly.

When so positioned with respect to the rear of the storage rack, the upwardly extending portions of the angle irons prevent food-related bundles from being positioned substantially beyond the end of the rack in the eighteen-inch "rodent free zone" between the rear side of the storage rack and the wall as mandated by AIB requirements. The angle irons prevent the food-related items from being positioned substantially beyond the end of the rack since the food-items are stored on top of a wooden pallet, which would make physical contact with the angle iron if it were moved substantially past the end of the storage rack.

Although generally satisfactory, the use of angle irons has a number of disadvantages, including the substantial cost of embedding them in the concrete floor, the fact that they are permanent and cannot easily be moved when the storage area is reconfigured, and the fact that they present obstructions on the floor which inhibits cleaning the floor.

SUMMARY OF THE INVENTION

The present invention is directed to a storage structure which includes a storage rack having a plurality of storage bays, each of which is adapted to store a bundle, such as a food-related bundle having a pallet and a number of boxes of food items positioned on the pallet. The storage bays are disposed in a plurality of rows, including an upper row and a lower row, disposed between the ends of the storage rack.

The storage structure has a transmitter for transmitting a beam of radiation and a receiver for receiving the beam of radiation. The transmitter is associated with the first end of the storage rack and is positioned to transmit the radiation beam in a direction substantially parallel to the side of the storage rack, and the receiver is associated with the second end of the storage rack. The storage structure has an alarm generator coupled to the receiver for generating an alarm when the radiation beam is interrupted by one of the bundles located on the storage rack.

The transmitter may be positioned to transmit the radiation beam at an elevation corresponding to that of a pallet when the pallet is disposed in one of the storage bays in the lower row, such as an elevation of between about zero and about eight inches above a floor on which the storage rack is located.

The invention is also directed to a method of using the storage structure which includes the steps of aligning one of the bundles with respect to one of the storage bays of the lower row, moving the bundle into the storage bay in a first direction until the bundle interrupts the radiation beam causing an alarm to be generated, and moving the bundle in the storage bay in a second direction opposite the first direction until the alarm is no longer generated.

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
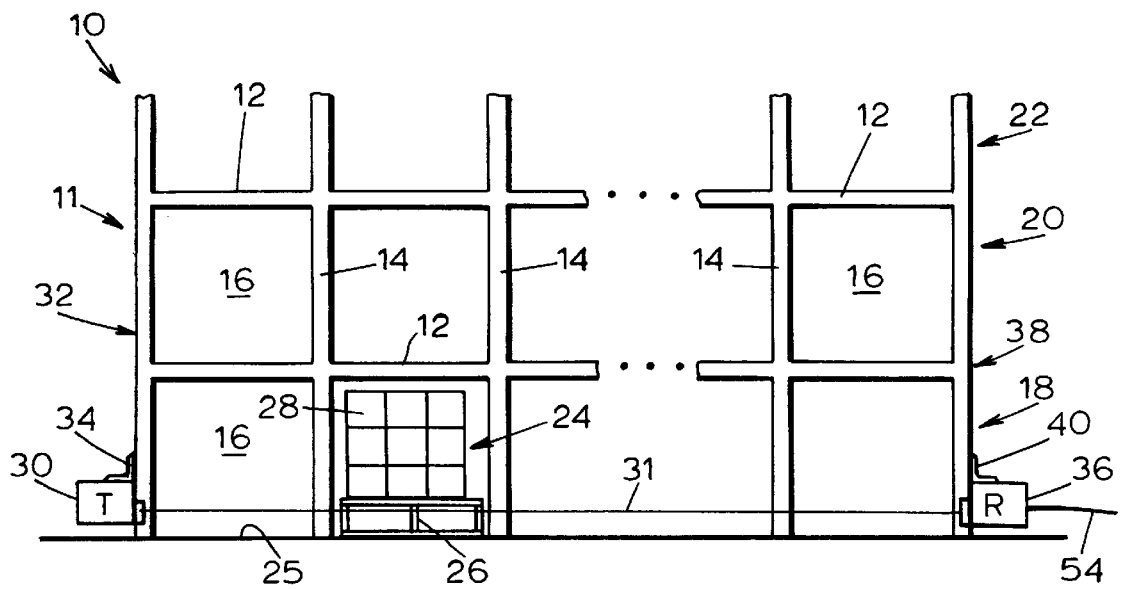
FIG. 1 is a side elevational view of a preferred embodiment of a storage structure in accordance with the invention.
Figure 2:
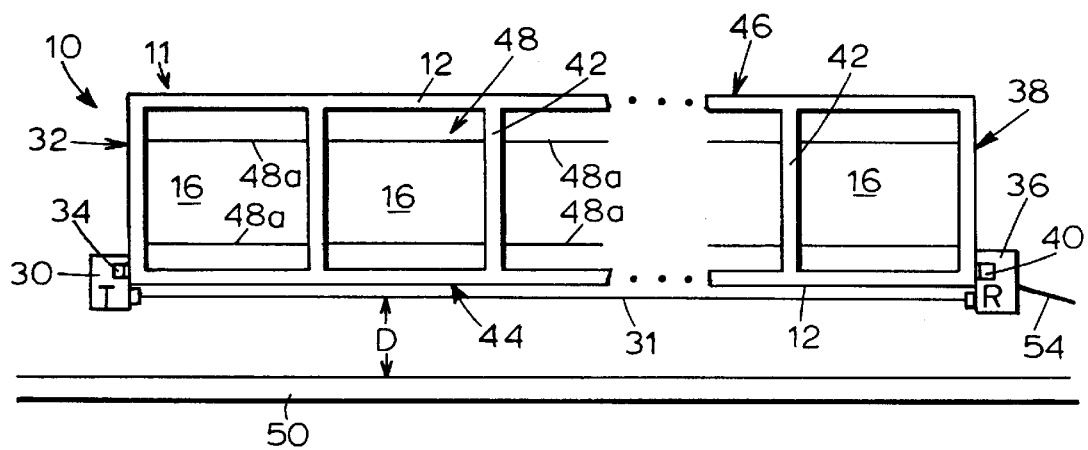
FIG. 2 is a top view of the storage structure of FIG. 1.
Figure 3:
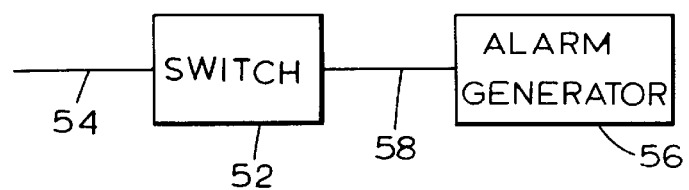
FIG. 3 is a block diagram of a switch and an alarm generator used in connection with the storage structure.

A preferred embodiment of a storage structure 10 in accordance with the invention is illustrated in FIGS. 1–3. Referring to FIG. 1, which is a side elevational view, the storage structure 10 includes a storage rack 11 composed of a number of horizontal steel beam members 12 and a number of vertical steel beam members 14. The horizontal and vertical beam members 12, 14 are joined together in a conventional manner, such as by bolting or welding, to form a number of rows of individual storage bays 16, including a bottom row 18, a middle row 20, and an upper row 22. It should be understood that additional rows of storage bays 16 could be provided.

A food-related bundle 24 is shown in one of the storage bays 16 of the bottom row 18. The food-related bundle 24, which rests on a floor 25 on which the storage rack 11 is disposed, is composed of a wooden pallet 26 on which a plurality of boxes 28 containing food items are positioned. The food boxes 28 may be held together in one unitary package via a clear cellophane or plastic covering (not shown).

A transmitter 30 for generating a beam 31 of radiation, such as a conventional laser transmitter, is fixed to an end 32 of the storage rack 11 via conventional fastening means, such as one or more L-shaped brackets 34, and a receiver 36 for receiving the radiation beam 31 is fixed to another end 38 of the storage rack 11 by one or more L-shaped brackets 40. The transmitter 30 is positioned to transmit the radiation beam 31 at an elevation coinciding with the pallet 26 in the bottom row 18 of the storage bays 16, and in particular at an elevation of between about zero and about eight inches above the floor 25. The transmitter 30 may be a Model No. 42GRL-9043-QE1 and the receiver 36 may be a Model No. 42GRR-9003-QD1, both of which are commercially available from Allen Bradley Co. Other types of transmitters and receivers could be used.

Referring to FIG. 2, which is a top view of the storage structure 10, the storage rack 11 has a number of steel cross-members 42 which join together the two sides 44, 46 of the storage rack 11, and each of the storage bays 16 of the rows 20, 22 is provided with a floor structure 48 for supporting one of the bundles 24 (the storage bays 16 of the row 18 are not provided with any floor structure). The floor structure 48, which is not considered pertinent to the invention, may be composed of a number of parallel support rods 48a.

As shown in FIG. 2, the transmitter 30 is positioned to transmit the radiation beam 31 in a direction substantially parallel to the side 44 of the storage rack 11 at a distance D of at least about eighteen inches from a wall 50 disposed generally parallel to the side 44 of the storage rack 11, and preferably at a distance between about eighteen inches and about thirty-six inches from the wall 50.

Referring to FIGS. 2 and 3, the receiver 36 is connected to a conventional switch 52, such as a switching transistor circuit or a relay, via an electrical line 54. The switch 52 is connected to an alarm generator 56 via an electrical line 58.

It should be noted that transmitter 30 and the receiver 36 are associated only with the bottom row 18, which is referred to herein as a "controlled" row, and that the rows 20, 22 do not have a transmitter and receiver associated therewith and are referred to herein as "uncontrolled" rows.

In use, bundles 24 may be loaded onto the storage rack 11 for temporary storage by a fork lift, for example. To load a bundle 24, the bundle 24 is first aligned with respect to one of the storage bays 16, and then the bundle 24 is moved by the fork lift into the storage bay 16 in a first direction until the bundle 24 interrupts the radiation beam 31. When that occurs, the receiver 36 no longer detects the radiation beam 31 and generates an interrupt signal to the switch 52 via the line 54, causing the switch 52 to activate the alarm generator 56, to cause an audio and/or visual alarm to be generated. Upon sensing the alarm, the fork lift operator moves the bundle 24 in the storage bay 16 in a second direction opposite the first direction until the alarm is no longer generated.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A storage structure comprising:

a wall;

a storage rack associated with said wall, said storage rack having a plurality of storage bays each of which is adapted to store a food-related bundle, said storage bays being disposed in a plurality of rows between a first end of said storage rack and a second end of said storage rack, said rows including an upper row and a lower row and said storage rack having a side disposed between said first and second ends;

means for transmitting a beam of radiation, said transmitting means being fixed to said first end of said storage rack and being positioned to transmit said radiation beam in a direction substantially parallel to said side of said storage rack at a distance of at least about eighteen inches from said wall and at an elevation coinciding with said lower row of said storage bays;

means for receiving said beam of radiation from said transmitting means, said receiving means being fixed to said second end of said storage rack; and means for generating an alarm when one of said food-related bundles is located on said storage rack in a position in which a portion of said one food-related bundle interrupts said beam of radiation transmitted from said transmitting means to said receiving means.

2. A storage structure as defined in claim 1 wherein each of said storage bays of said storage rack is adapted to accommodate a pallet and a plurality of food-related boxes disposed on top of said pallet.

3. A storage structure as defined in claim 1 wherein each of said storage bays of said storage rack is adapted to accommodate a pallet and a plurality of food-related boxes disposed on top of said pallet and wherein said transmitting means is positioned to transmit said radiation beam at an elevation corresponding to that of said pallet when said pallet is disposed in one of said storage bays in said lower row.

4. A storage structure as defined in claim 1 wherein said transmitting means is positioned to transmit said radiation beam at a distance of between about eighteen inches and about thirty-six inches from said wall.

5. A storage structure as defined in claim 1 wherein said transmitting means is positioned to transmit said radiation beam at an elevation of between about zero and about eight inches above a floor on which said storage rack is disposed.

6. A storage structure as defined in claim 1 wherein said storage rack comprises at least three rows of said storage bays, said three rows including a bottom row, a second row above said bottom row, and a third row above said second row, one of said rows comprising a controlled row having said transmitting and receiving means associated therewith and at least one of said rows comprising an uncontrolled row.

7. A storage structure comprising:

a wall;

a storage rack associated with said wall, said storage rack having a plurality of storage bays each of which is adapted to store a food-related bundle, said storage bays being disposed in a plurality of rows between a first end of said storage rack and a second end of said storage rack, said rows including an upper row and a lower row and said storage rack having a side disposed between said first and second ends;

means for transmitting a beam of radiation, said transmitting means being associated with said first end of said storage rack and being positioned to transmit said radiation beam in a direction substantially parallel to said side of said storage rack at a distance of at least about eighteen inches from said wall and at an elevation coinciding with said lower row of said storage bays;

means for receiving said beam of radiation from said transmitting means, said receiving means being associated with said second end of said storage rack; and means for generating an alarm when one of said food-related bundles is located on said storage rack in a position in which a portion of said one food-related bundle interrupts said beam of radiation transmitted from said transmitting means to said receiving means.

8. A storage structure as defined in claim 7 wherein each of said storage bays of said storage rack is adapted to accommodate a pallet and a plurality of food-related boxes disposed on top of said pallet.

9. A storage structure as defined in claim 7 wherein each of said storage bays of said storage rack is adapted to accommodate a pallet and a plurality of food-related boxes disposed on top of said pallet and wherein said transmitting means is positioned to transmit said radiation beam at an elevation corresponding to that of said pallet when said pallet is disposed in one of said storage bays in said lower row.

10. A storage structure as defined in claim 7 wherein said transmitting means is positioned to transmit said radiation beam at a distance of between about eighteen inches and about thirty-six inches from said wall.

11. A storage structure as defined in claim 7 wherein said transmitting means is positioned to transmit said radiation beam at an elevation of between about zero and about eight inches above a floor on which said storage rack is disposed.

12. A storage structure as defined in claim 7 wherein said storage rack comprises at least three rows of said storage bays, said three rows including a bottom row, a second row above said bottom row, and a third row above said second row, one of said rows comprising a controlled row having said transmitting and receiving means associated therewith and at least one of said rows comprising an uncontrolled row.

13. A storage structure comprising:
   a storage rack having a plurality of storage bays each of which is adapted to store a bundle, said storage bays being disposed in a plurality of rows between a first end of said storage rack and a second end of said storage rack, said rows including an upper row and a lower row and said storage rack having a side disposed between said first and second ends;
   means for transmitting a beam of radiation, said transmitting means being associated with said first end of said storage rack and being positioned to transmit said radiation beam in a direction substantially parallel to said side of said storage rack;
   means for receiving said beam of radiation from said transmitting means, said receiving means being associated with said second end of said storage rack; and
   means for generating an alarm when one of said bundles is located on said storage rack in a position in which a portion of said one bundle interrupts said beam of radiation transmitted from said transmitting means to said receiving means.

14. A storage structure as defined in claim 13 wherein each of said storage bays of said storage rack is adapted to accommodate a pallet and a plurality of boxes disposed on top of said pallet.

15. A storage structure as defined in claim 13 wherein each of said storage bays of said storage rack is adapted to accommodate a pallet and a plurality of boxes disposed on top of said pallet and wherein said transmitting means is positioned to transmit said radiation beam at an elevation corresponding to that of said pallet when said pallet is disposed in one of said storage bays in said lower row.

16. A storage structure as defined in claim 13 wherein said transmitting means is positioned to transmit said radiation beam at an elevation of between about zero and about eight inches above a floor on which said storage rack is disposed.

17. A storage structure as defined in claim 13 wherein said storage rack comprises at least three rows of said storage bays, said three rows including a bottom row, a second row above said bottom row, and a third row above said second row, one of said rows comprising a controlled row having said transmitting and receiving means associated therewith and at least one of said rows comprising an uncontrolled row.

18. A method of storing a bundle in a storage structure having a storage rack with a plurality of storage bays each of which is adapted to store a bundle, said storage bays being disposed in a plurality of rows between a first end of said storage rack and a second end of said storage rack, said rows including an upper row and a lower row and said storage rack having a side disposed between said first and second ends, means associated with said first end of said storage rack for transmitting a beam of radiation, said transmitting means being positioned to transmit said radiation beam in a direction substantially parallel to said side of said storage rack, means associated with said second end of said storage rack for receiving said beam of radiation from said transmitting means, and means for generating an alarm when one of said bundles is located on said storage rack in a position in which a portion of said one bundle interrupts said beam of radiation transmitted from said transmitting means to said receiving means, said method comprising the steps of:
   (a) aligning one of said bundles with respect to one of said storage bays of said lower row;
   (b) moving said one bundle into said one storage bay in a first direction until said one bundle interrupts said radiation beam causing an alarm to be generated; and
   (c) moving said one bundle in said one storage bay in a second direction opposite said first direction until said alarm ceases to be generated.

19. A storage structure comprising:
   a storage rack having a plurality of storage bays each of which is adapted to store a bundle, said storage bays being disposed in a plurality of rows between a first end of said storage rack and a second end of said storage rack, said storage rack having a side disposed between said first and second ends;
   a transmitter adapted to transmit a beam of radiation, said transmitter being associated with said first end of said storage rack and being positioned to transmit said radiation beam in a direction substantially parallel to said side of said storage rack;
   a receiver adapted to receive said beam of radiation from said transmitter, said receiver being associated with said second end of said storage rack; and
   an alarm generator adapted to generate an alarm when one of said bundles is located on said storage rack in a position in which a portion of said one bundle interrupts said beam of radiation transmitted from said transmitter to said receiver.

20. A storage structure as defined in claim 19 wherein said transmitter is positioned to transmit said radiation beam at an elevation of between about zero and about eight inches above a floor on which said storage rack is disposed.

\* \* \* \* \*